Nov. 16, 1943.  C. H. PETERSON  2,334,505
UNIVERSAL SPRING HOOKING AND LOOPING MACHINE
Filed March 13, 1942  7 Sheets-Sheet 1

Inventor:
CARL H. PETERSON,
by: John E. Jackson
his Attorney.

Nov. 16, 1943.    C. H. PETERSON    2,334,505
UNIVERSAL SPRING HOOKING AND LOOPING MACHINE
Filed March 13, 1942    7 Sheets-Sheet 2

Inventor:
CARL H. PETERSON,
by John E. Jackson
his Attorney.

Nov. 16, 1943.    C. H. PETERSON    2,334,505
UNIVERSAL SPRING HOOKING AND LOOPING MACHINE
Filed March 13, 1942        7 Sheets-Sheet 4

Inventor:
CARL H. PETERSON,
by John E. Jackson
his Attorney.

Nov. 16, 1943.     C. H. PETERSON     2,334,505
UNIVERSAL SPRING HOOKING AND LOOPING MACHINE
Filed March 13, 1942     7 Sheets-Sheet 6

Inventor:
CARL H. PETERSON,
by: John E. Jackson
his Attorney.

Nov. 16, 1943.  C. H. PETERSON  2,334,505
UNIVERSAL SPRING HOOKING AND LOOPING MACHINE
Filed March 13, 1942  7 Sheets-Sheet 7

Inventor:
CARL H. PETERSON,
by: John E. Jackson
his Attorney.

Patented Nov. 16, 1943

2,334,505

UNITED STATES PATENT OFFICE 2,334,505

UNIVERSAL SPRING HOOKING AND LOOPING MACHINE

Carl H. Peterson, Worcester, Mass., assignor to The American Steel and Wire Company of New Jersey, a corporation of New Jersey Application March 13, 1942, Serial No. 434,601

11 Claims. (Cl. 140—103)

The present invention relates to an improved power driven tool adapted to receive coiled springs of various sizes and to form hooks or loops on the ends thereof.

An object of the invention is to provide a single power driven tool capable of handling a variety of diameters of springs and provided with devices whereby hooks or loops differing in form and differently disposed with respect to the axis of the spring can be produced at the end of the spring by making certain precision adjustments.

The invention will be fully apparent from the following detailed disclosure when read in connection with the accompanying drawings and will be defined with particularity in the appended claims.

Referring in detail to the drawings, the numeral 10 represents the base of the machine which is extended laterally at one side as viewed in plan to accommodate a conventional form of drive motor 12 and a known type of gear reduction unit contained within a housing 14. The motor 12 drives a shaft 16 through the reduction unit which in turn drives a pulley 18 and a belt 20. The belt 20 is trained around and therefore drives a pulley 22 carried by the main shaft 24 of the improved loop forming machine of the present invention. The main shaft 24 carries a manually operable hand wheel 26 by means of which the mechanism can be slowly turned over by hand to initially set the various adjustable parts to be hereinafter referred to in detail.

The improved machine is specially designed to form various forms of hooks or loops on the extremities of springs. For purpose of illustration I have shown a variety of hooks and loops in Figures 14 through 22, all of which can be formed by making certain adjustments in the mechanism, as will hereinafter appear.

In the manufacture of springs used for various specialty items it is frequently necessary to provide a hook or ring-like loop on one or both extremities of the spring so that such spring can always be assembled and anchored in a given relative position with respect to other devices which it is to operate. The machine of the present invention provides coacting instrumentalities specially designed for forming hooks or ring-like loops in a number of predetermined positions relative to the spring proper. The coiled material from which the springs are formed is received by the operator in closely wound helical condition devoid of hooks or projections of any kind suitable for anchorage purposes.

The machine includes a vertically movable carrier 28 which, in the embodiment illustrated, is in the form of a rod securable at different elevations in a lug 30 projecting laterally from a vertically movable slide 32. The lug carries a set screw 34 by manipulation of which the vertical setting of the carrier can be varied to suit the length of different size springs being handled. On the lower extremity of the carrier there is a depending shank 36, the diameter of which makes a fairly snug fit with the interior of the particular size of spring being handled.

Figure 1:
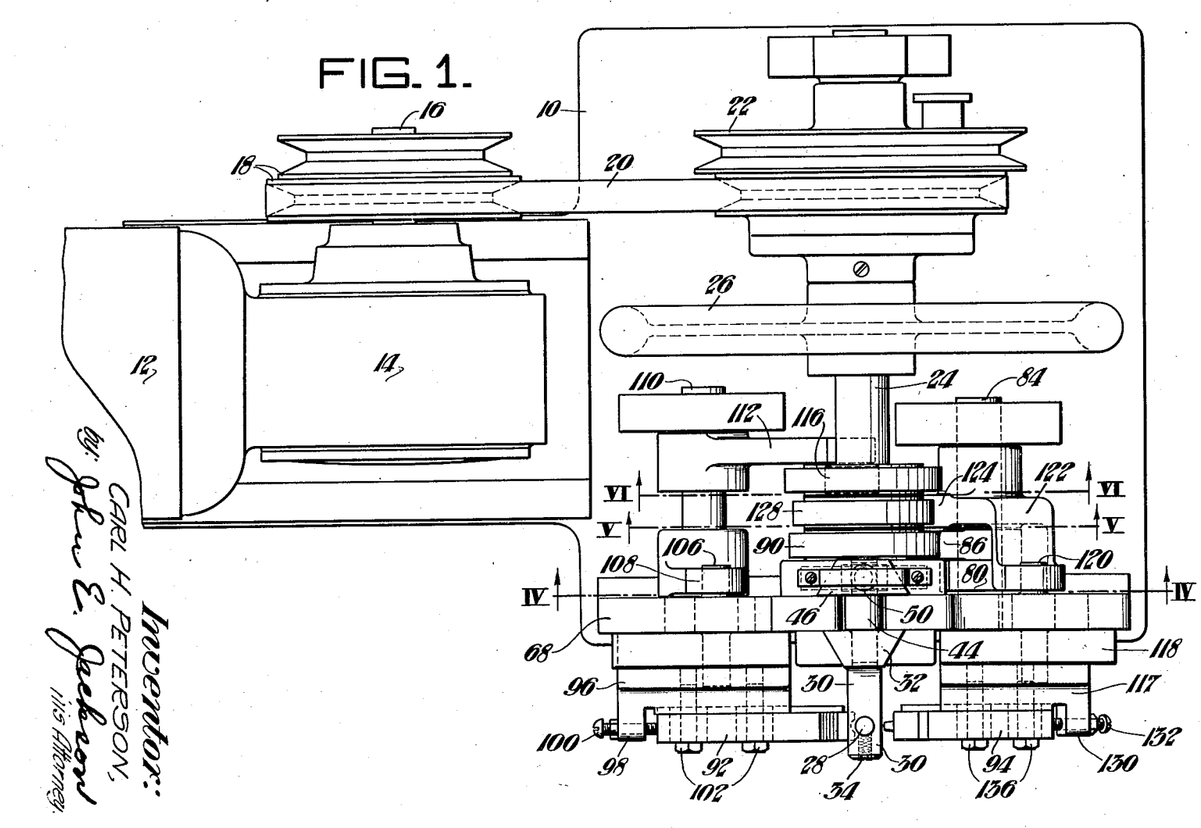
Figure 1 is a plan view of the machine illustrating a preferred embodiment of the invention.
Figure 2:
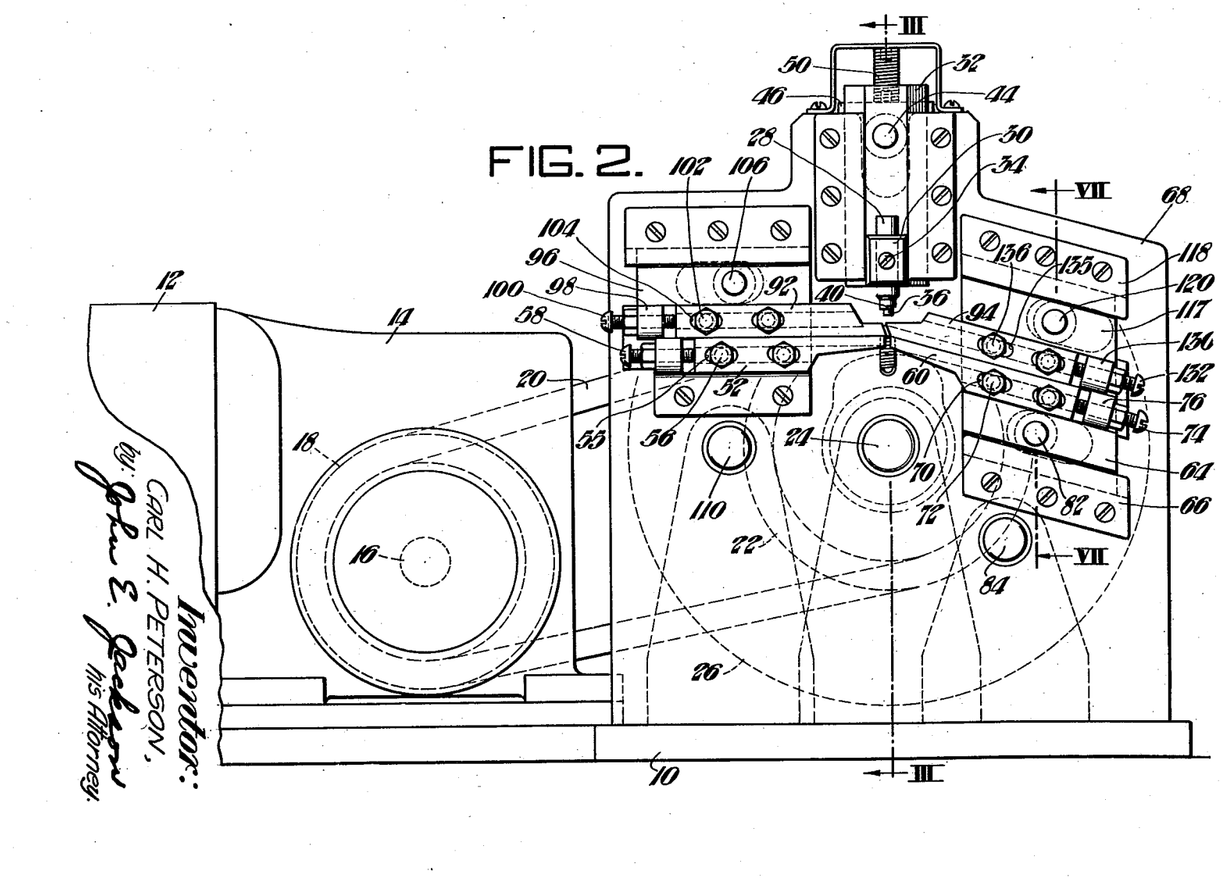
Figure 2 is an end view thereof.
Figure 3:
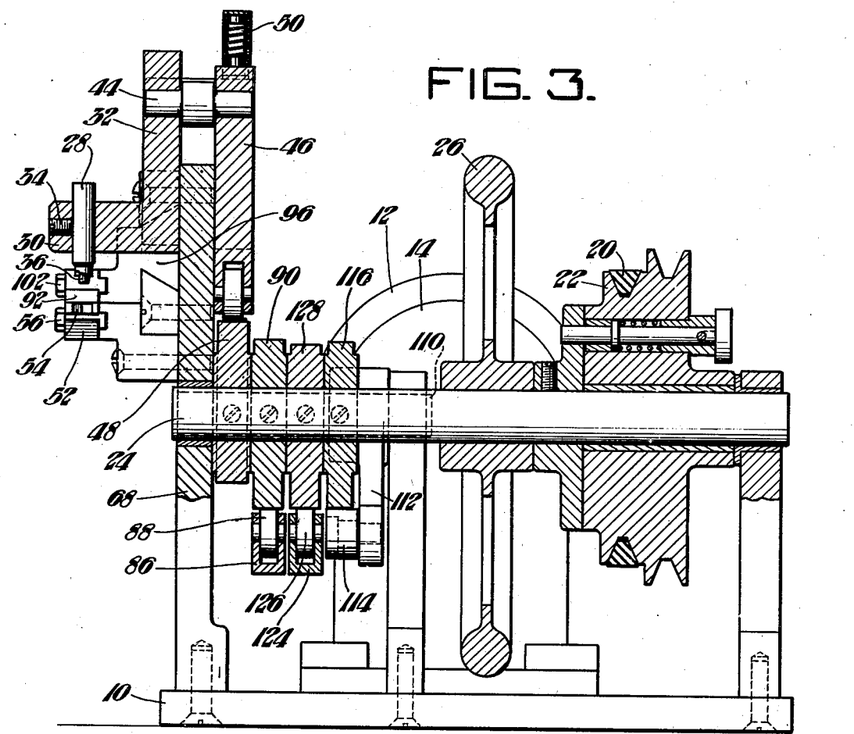
Figure 3 is a longitudinal section on line III—III of Figure 2.

It will be understood that carriers of different diameters to suit different sizes of springs handled may be received by the lug 30 and fitted to the machine by manipulation of the set screw 34. The machine is designed for manual feeding while the carrier 28 is in the upper dwell position shown in Figure 2. The operator engages a blank spring over the lower end of the shank 36 and gives the same an upward motion and a quick turn or twist to the left so as to bring the end convolution 38 of the spring into abutting engagement with a shoulder 40 forming part of a notch 42 provided in the carrier for this purpose.

The slide 32 on which the carrier 28 is mounted is connected by a pin 44 with a slide 46 which is arranged to be vertically reciprocated in one direction by a cam 48 and in the opposite direction by a spring 50, the cam being mounted on the main shaft 24. The main shaft 24 revolves constantly, but there is a concentric dwell portion on the cam of sufficient arcuate length to permit the carrier to remain in the upper or retracted position for a sufficient length of time to enable the operator to engage the springs therewith.

Upon rotation of the cam 48 to predetermined position, the spring 50 forces the carrier downwardly so as to bring it into proper position for the formation of a hook or loop thereon.

The hooking and looping instrumentalities include means for gripping the upper extremity of the spring to be acted upon so as to hold the same and permit it to be stripped from the carrier. The mechanism also includes a backing up die and a bending die, both of which jointly cooperate with the holding or gripping means. The gripping means, the backing up means and the hook bending tool are all so constructed and arranged that they can be adjusted relative to one another with great precision so as to form the various types of looped or hooked ends shown in Figures 14 through 22.

Figure 13:
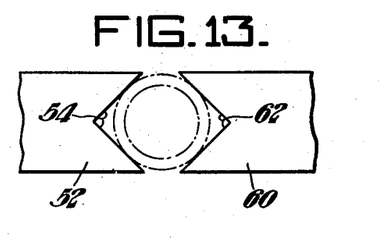
Figure 13 is a plan view of the jaws which hold the spring while its end is being operated upon.

The gripping or holding means includes a normally fixed jaw body 52 whose inner extremity is provided with a V-shaped seat 54 (see Figure 13) so as to effectively grip the periphery of springs of different diameters. The body 52 is slotted at 55 to permit of adjustment relative to fastening screws 56. The lateral position of the jaw body 52 can be varied by manipulating the adjusting screw 58, a slidable mounting being provided therefor as shown.

A movable clamping jaw 60 is provided with a recessed seat 62 in its inner extremity for engagement with the side of the spring opposite the portion engaged by the fixed jaw 52. This movable jaw is carried by a laterally movable slide 64 which is guided by an inclined gib 66 suitably secured to an upright frame member 68. The movable jaw 60 is slotted at 70 so as to permit adjustment relative to fastening screws 72. An adjusting screw 74 threaded through a lug 76 serves to initially set with precision and hold the movable jaw in any desired predetermined position of adjustment.

Figure 4:
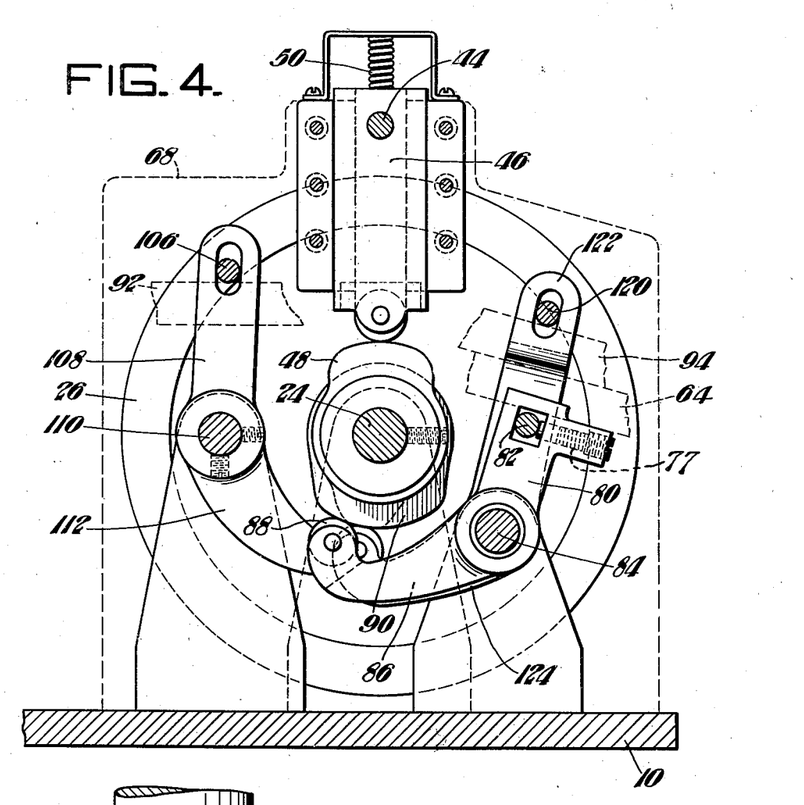
Figures 4, 5 and 6 are detail sectional views on the correspondingly numbered section lines of Figure 1 illustrating the cams and related means for actuating different essential operating parts of the device.
Figure 5:
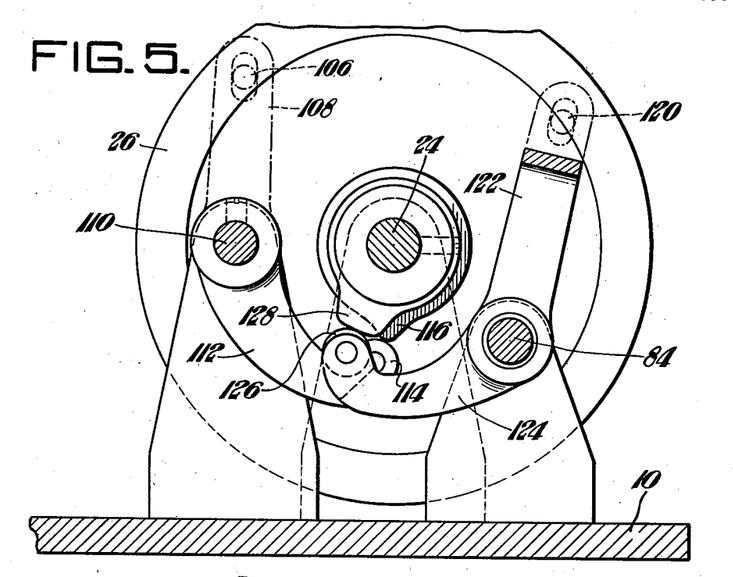
Figure 6:
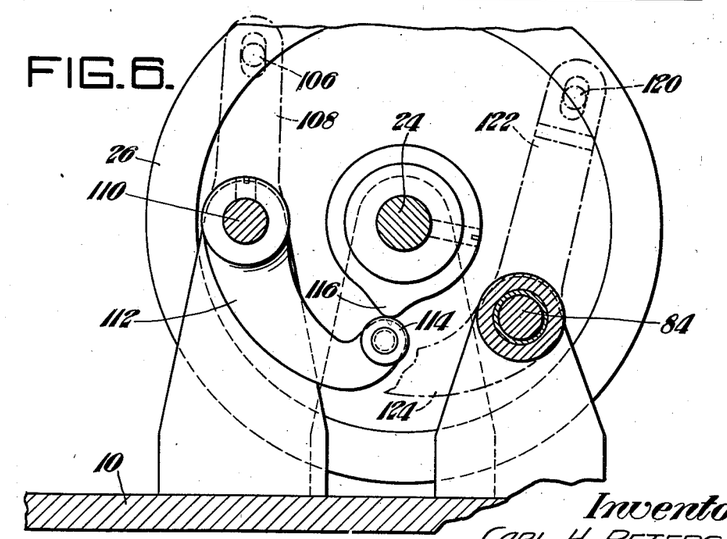
Figure 7:
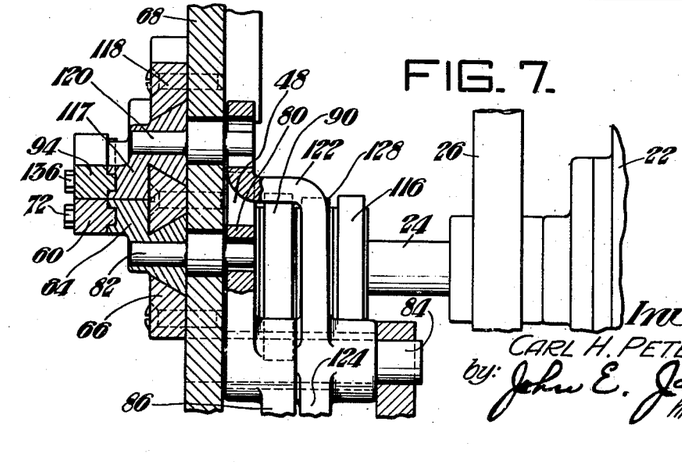
Figure 7 is a sectional elevation on line VII—VII of Figure 2.

An adjustable spring cushion element, such as shown at 77 in Figure 4, is provided to compensate for slight variations in diameter of springs to be hooked or looped so as to hold the spring firmly in the grip of the holding means while the hook or loop is being formed. This cushion element may be conveniently built into the operating lever 80, hereinafter described, which actuates the slide 64.

The slide 64 which actuates the movable jaw 60 is moved laterally by a lever 80 which has a yielding lost motion connection with a pin 82 through the cushion element 77. This lever 80 is carried on a supporting stud 84 and is rocked by a lever arm 86 having a cam follower 88 at its inner extremity which receives motion from a cam 90. It will be apparent that upon rotation of the cam 90 the lever arms 80 and 86 will be rocked about the supporting stud 84 to thus move the jaw 60 inwardly into such position that its recessed seat 62 will engage the periphery of the spring. Thus the fixed jaw 52 and the movable jaw 60 jointly grip the upper portion of the spring so as to firmly hold the same after the carrier has been retracted. The cushion element 77 in coaction with the pin 82 provides a lost motion connection between the lever 80 and the slide 64, thus making it possible for the cushion element to yield and thus compensate for variations in the sizes of springs handled.

While the spring is so held by the jaws 52 and 60, a backing up die member 92 and a bending tool 94 are adapted to come into play to deflect either a part of, or one or more complete upper convolutions of the spring, from the position in which it was originally coiled, to various desired positions hereinafter more fully shown and described.

The backing up tool or die 92 is adjustably mounted on a slide 96 which carries a laterally extending lug 98 and an adjusting screw 100 and securing screws 102. The screws 102 pass through slots 104 so as to permit the lateral movement required of the backing up tool 92, as will be understood. The slide 96 is connected by a pin 106 with a lever arm 108 mounted on a rock shaft 110. Another lever 112 is secured to the rock shaft 110 and at its outer end it carries a cam follower 114 for coaction with a cam 116 secured to the main shaft 24. As thus arranged it will be apparent that rotation of the shaft 24 will be effective to reciprocate the backing up die or tool 92 in proper timed relation with the movements of other parts previously referred to and to be hereinafter described.

The bending or forming tool 94 is adjustably mounted on a slide 117 which is guided by an inclined gib 118. The slide 117 carries a pin 120 which is actuated by the upper end of a lever 122 mounted on the aforementioned supporting stud 84. The lever 122 has an inwardly extended arm 124 carrying a cam follower 126 for coaction with a cam 128 carried by the main shaft 24. The slide 117 carries a lug 130 through which is threaded an adjusting screw 132 which bears against the rear face of the bending tool 94 on the slide. The body of this bending tool is slotted at 135 for coaction with the fastening screws 136. The parts as described are so constructed and arranged that the slide 117 will move inwardly to an extent determined by the configuration of the actuating cam 128.

The compact unitary mechanism shown and described is adapted to be adjusted to produce various forms of hooked or looped ends on springs such as shown in Figures 14 through 22.

Figure 8:
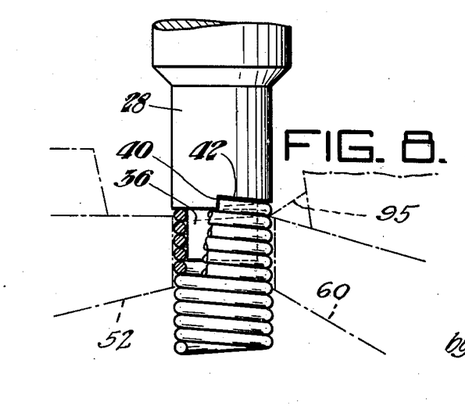
Figure 8 is an enlarged detail view of a spring in starting condition placed on a work carrier to be subsequently moved to an operative station to have a hook or loop formed on one end thereof.
Figure 9:
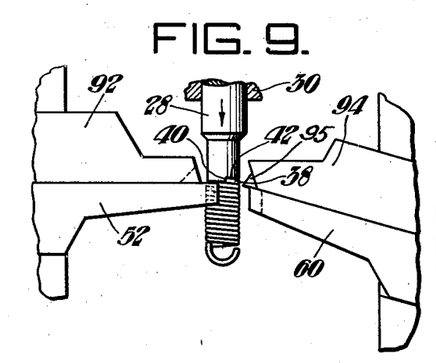
Figure 9 is a fragmentary view illustrating the position of the parts after the work carrier has moved the spring to the station it is to occupy during the formation of a hook or loop thereon.
Figure 11:
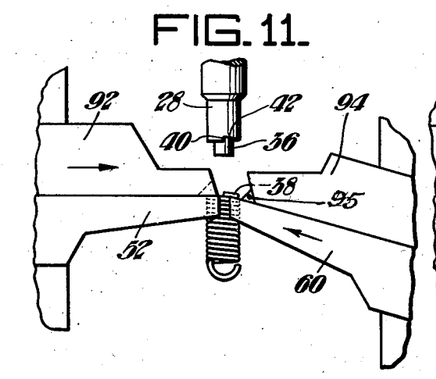
Figure 11 is a diagrammatic view similar to Figure 10 but showing the backing tool in position for later coaction with the bending tool.
Figure 12:
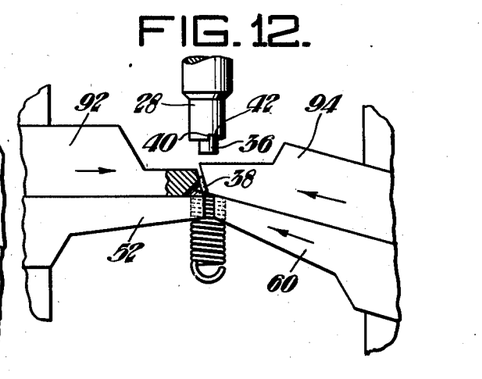
Figure 12 is a view of the same parts shown in Figure 11 after the bending tool has moved to position to complete the formation of the hook shown in Figure 14.
Figure 14:
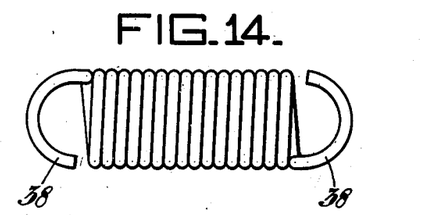
Figure 14 is a detail view of a spring having semi-circular hook-like ends formed thereon by the machine illustrated.
Figure 15:
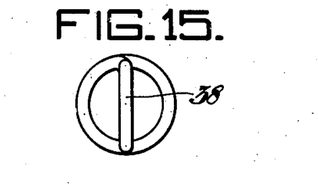
Figure 15 is an end view of Figure 14.

In the formation of the spring hook as shown in Figure 14, one-half of one end convolution is bent from its coiled position through an angle of approximately 90 degrees. This movement is effected by cooperation of the parts illustrated in Figures 8, 9 and 10. In so forming the spring end, the operator first places a piece of helically coiled stock on the shank 36 and gives the same a quick twisting motion until the end coil of the blank spring comes to rest against the abutment portion 40 of the notch 42 formed in the carrier. The carrier then moves the spring blank downwardly to the position of Figure 9, where the fixed jaw 52 and the backing die 92 move inward to the position of Figure 9. Immediately thereafter the gripper jaw 60 moves inward to the position of Figure 10; thus the spring is firmly held in the grip of the jaws 52 and 60. The carrier 28 now moves upward, thus withdrawing the shank from the gripped spring blank. The forming or bending tool 94 is so adjusted that the underside of its inner pointed tooth 95 lies in a plane corresponding to the plane of the underside of the topmost convolution of the spring to be acted upon. This position of adjustment can be secured with precision by adjusting the screw 132. When adjusted with such precision the inward movement of the slide 117 will carry the forming tool 94 from the position of Figure 11 inward to the position of Figure 12, whereupon one-half of the topmost convolution 38 of the spring will be bent through an angle of about 90 degrees from the coiled position of Figures 9 and 10 to the substantially axial position of Figure 12. Thus, one-half of the uppermost convolution of the spring will be bent to a position to transform it into the semicircular hook such as illustrated in Figures 14 and 15. Other configurations and dispositions of hooks or ring-like extremities can be formed on the springs by adjusting the parts in different ways, as will now be described.

Figure 16:
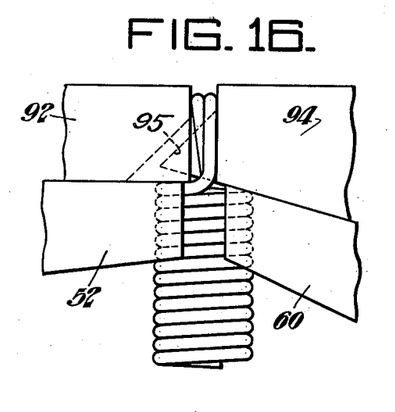
Figure 16 is a view showing the bending and backing dies adjusted to form a double coil circular ring-like loop axially centered at the end of the spring.
Figure 17:
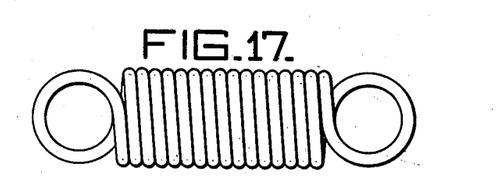
Figure 17 is a detail of the spring shown in Figure 16.
Figure 18:
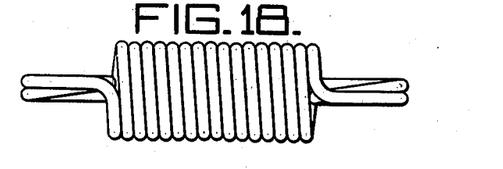
Figure 18 is a bottom view of the spring shown in Figures 16 and 17 illustrating the double loop formed centrally at the end thereof when the backing and bending tools are adjusted to the position shown in Figure 16.
Figure 23:
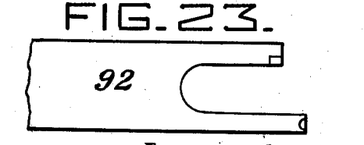
Figure 23 is a plan view of the tool 92 shown in Figure 16.

For example, by manipulating the adjusting screws 100 and 132, the backing up die 92 and the bending tool 94, respectively, can be set to the positions shown in Figure 16 for the purpose of forming the double-ring-like loop on the end of a spring as shown in Figures 17 and 18. This adjustment can be made with great precision so as to properly set the inner tooth 95 of the tool 94 so it will, when moved inwardly from approximately the position of Figure 11 to the position of Figure 16, engage the underside of the second convolution from the top of the spring and thus bend upwardly two of the end coils to dispose them axially across the diameter of that end of the spring. The front face of the tool 92 is longer on one side than on the other, as shown in plan in Figure 23, so as to accommodate the helical position of the last convolution of the spring. Thus the double loop of Figures 17 and 18 is formed.

Figure 19:
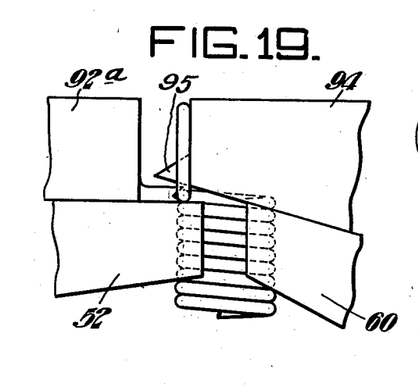
Figure 19 is a view showing the bending and backing tools adjusted to form an eye or loop tangent to the end coils thereof.
Figure 20:
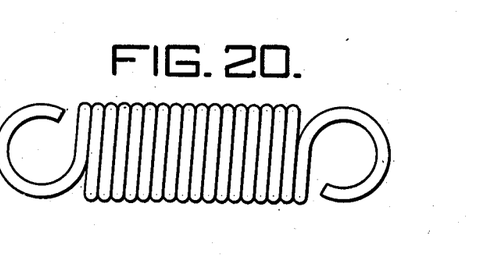
Figure 20 is a detail of the spring shown in Figure 19.
Figure 21:
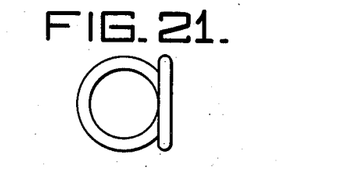
Figure 21 is an end view of the spring of Figures 19 and 20 showing the tangent disposition of the loop on one end thereof.

By laterally adjusting an interchangeable backing up die 92ª and the bending die 94 to respective appropriate positions, these parts can be so set that they will bend the uppermost convolution of the spring into a loop which is tangent to the outermost coil, as shown in Figures 20 and 21. Figure 19 illustrates the action of the parts after they have been set and operated to bring about this result.

Figure 22:
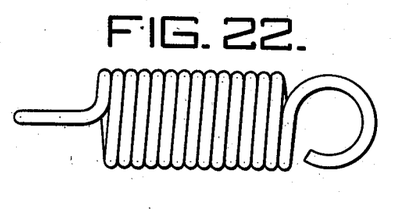
Figure 22 is a view illustrating a spring having a ring-like looped right end which is disposed at right angles to the similar hooked end at the left terminus of the same spring adapted to be produced by making appropriate adjustments in the machine herein disclosed.

Figure 22 illustrates a slight modification of the hooked ends in which the hooks are substantially complete rings formed by bending a complete convolution at each end through an angle of about 90 degrees. The end hook-like loops are disposed at right angles on the opposite ends, this disposition being securable at the will of the operator by properly setting the notch 40 by turning and adjusting the carrier 28 axially.

Figure 10:
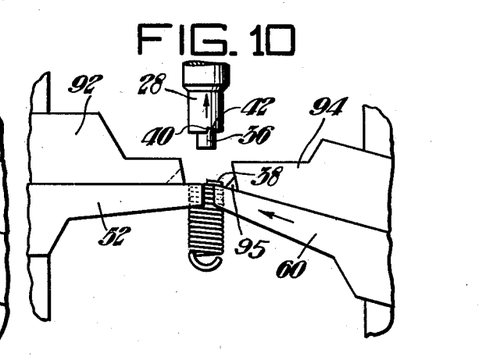
Figure 10 is a fragmentary view of parts shown in Figures 8 and 9 after the spring carrier has been retracted and the spring has been gripped by coacting clamp jaws and its extremity held in position to be subsequently acted upon by tools effective to form a loop or hook at one extremity thereof.

In the formation of the different configurations of hooks or looped extremities formed on the spring, a nicety of adjustment is required in order that either one full convolution or one-half of a single end convolution or two or more end convolutions will be properly engaged by the backing up member 92 and by the bending tool 94. In order to secure this nicety of adjustment the relative positions of the gripping jaws, the backing up die and the bending tool must be accurately controlled. The precision adjustment required for this nicety of control is made possible by the utilization of the specific supporting means illustrated including the inclined gibs, the guide, the respective slides for supporting the movable grippers and the bending tool. Because these members are inclined with respect to the horizontally disposed fixed member 52 and the backing up die 94, it will be appreciated that lateral adjustment of members 60 and 94 will vary the elevation at which they coact with the fixed die and the backing up die. In this way the mechanism is rendered universally adjustable so as to permit bending up of one or more end convolutions or a fractional part of a single end convolution. It is clear that when the backing die is adjusted to position, its inner end over the central axis of the spring held by the grippers, then the half convolution opposite the backing die will be first pried upward as the bending tool moves in toward said backing die. Continued inward movement of the forming tool will then bend the half convolution through an angle of about 90 degrees to firmly press it and fulcrum it against the backing die as shown in Figure 10, thus completing the semicircular hoop shown.

Thus it is manifest that by coordinating the initial elevation adjustment of the notched carrier with the respective precision adjustments of the grippers, the backing die and the bending tool, a large variety of end hooks or loops can be formed to suit varying requirements on springs of a given uniform size, and by changing the size of the carrier shank, springs of different sizes can be readily operated upon. The yielding cushion members, through which motion is transmitted to the clamping, backing and bending tools, permit the use of a single machine having constant stroke levers and cams in handling springs of different diameter, or in handling springs made from wire of different gauges, since the yielding of said cushions will compensate for such variations.

While I have described specific mechanism for producing springs having terminal hooks or loops of specific kinds, it is not to be construed that I am limited thereto since various modifications may be made by those skilled in the art without departure from the invention as defined in the appended claims.

I claim:

1. In a machine of the class described, a carrier having a shank to receive a length of coiled spring wire, said shank having an abutment for positioning the end convolution of the spring to be acted upon, means for moving the carrier toward and from a hook forming station, means at said station for gripping a spring carried by said shank, and means for bending one or more end convolutions of the spring held by said gripping means through a predetermined angle.

2. In a machine of the class described, a carrier for a spring whose end convolution is to be formed into a hook or loop, said carrier having an abutment for positioning the end convolution of the spring to be acted upon, means for moving said carrier toward and from a hook forming station, grippers at said station for engaging each spring and holding it after said carrier leaves said station, and means for bending one or more end convolutions of the spring into a plane substantially parallel with the longitudinal axis thereof.

3. In a machine of the class described, a carrier having a shank for engagement with the end of a length of coiled spring wire, said shank having an abutment for positioning the end convolution of the spring to be acted upon, gripping means including a yielding cushion element effective to compensate for variations in spring sizes, and means for bending a predetermined portion of the coiled extremity of the spring into a plane substantially parallel with the longitudinal axis of the spring.

4. In a machine of the class described, a spring carrier having a shank to receive a coiled spring wire movable toward and from a forming station, said shank having an abutment for positioning the end convolution of the spring to be acted upon, means at said station effective to grip a spring fed thereto and retain it after the carrier is retracted, and coacting members engageable with an end coiled portion of the spring effective to bend it through a predetermined angle.

5. In a machine of the class described, a spring carrier movable toward and from a forming station, said carrier having an abutment for positioning the end convolution of the spring to be acted upon, means at said station effective to grip a spring fed thereto and retain it after the carrier is retracted, coacting tools engageable with an end coiled portion of the spring effective to bend it through a predetermined angle, respective means for actuating said tools, and a yielding cushion element interposed between one of said tools and one of said actuating means effective to compensate for variations in spring sizes.

6. In a machine of the class described, a spring carrier movable toward and from a hook forming station, said carrier having an abutment for positioning the end convolution of the spring to be acted upon, means at said station effective to grip a spring fed thereto and retain it after the carrier is retracted, coacting tools engageable with an end coiled portion of the spring effective to bend such coiled portion through a predetermined angle, respective means for actuating said tools, respective movable supports for said tools, means for adjusting one of said tools with precision relative to its support so as to determine whether one or more convolutions of the spring or a fractional part of a convolution shall be acted upon by said tool.

7. In a machine of the class described, a spring carrier movable toward and from a forming station, means at said station effective to grip a spring fed thereto and retain it after the carrier is retracted, coacting tools engageable with an end coiled portion of the spring effective to bend such coiled portion through a predetermined angle, respective means for actuating said tools, respective movable supports for said tools, means for adjusting one of said tools with precision relative to its support so as to determine whether one or more convolutions or a fractional part of a convolution shall be acted upon by said tool, and a yielding cushion element interposed between said adjusting means and said tool effective to compensate for variations in spring diameters or variations in the gauge of wire from which the springs are made.

8. In a machine of the character described, a slide mounted for vertical movement, a carrier adjustably secured therein having an abutment for positioning the end of a spring to be acted upon, means for moving said slide to and from a hook forming station, gripping means including a jaw movable transversely of said carrier, mechanism for actuating the movable jaw in timed relation to the movements of the carrier, a backing die and a bending tool mounted for coaction with an upper convolution of a spring held by said gripping means, and means for actuating the bending tool in predetermined timed relation to the movements of said carrier and said gripping means.

9. The apparatus of claim 8 wherein a cushion element is interposed between the movable jaw and the actuating mechanism therefor so as to compensate for variations in the diameters of springs or in the gauge of the wire from which they are formed, respective laterally movable slides on which said movable jaw and said bending tool are mounted, and respective means for adjusting with precision the positions of said movable jaw and said bending tool relative to the respective slides which support them.

10. In a machine of the character described, coacting gripping elements engageable with the periphery of a spring, means for moving said elements into and out of gripping engagement with said spring, a die member positioned for coaction with an end convolution of said spring, a bending tool coacting with said die member, supporting means for said tool, means for guiding the latter along a straight path oblique to the longitudinal axis of the spring, and means for moving the supporting means along said oblique path toward and from the spring.

11. In a machine of the character described, coacting gripping elements engageable with the periphery of a spring, means for moving said elements into and out of gripping engagement with said spring, a die member positioned for coaction with an end convolution of said spring, a bending tool coacting with said die member, supporting means for said tool, means for guiding the latter along a straight path oblique to the longitudinal axis of the spring, a cushion element coacting with one of the gripping elements to compensate for variations in sizes of springs engaged thereby, means for adjusting the bending tool relative to said supporting means so as to vary the elevation at which the tool will engage an end convolution of said spring, and means for moving said supporting means along said oblique path toward and from the spring.

CARL H. PETERSON.